United States Patent [19]

Kolkhir et al.

[11] 3,803,693

[45] Apr. 16, 1974

[54] METHOD FOR EXTRACTING METAL REINFORCING PLIES FROM AUTOMOBILE TIRES AND A DEVICE FOR ACCOMPLISHING SAME

[76] Inventors: Karl Filippovich Kolkhir, Magistralnaya ulitsa 9; Jury Arkadievich Kogan, 1 Proletarskaya ulitsa 9, kv. 84; Vladimir Egorovich Khmelev, ulitsa Lenina, 14, kv. 9; Vladimir Yakovlevich Krasovsky, ulitsa Chekhova 37, kv. 11, all of Moskovskaya oblast, U.S.S.R.

[22] Filed: Dec. 14, 1972

[21] Appl. No.: 315,242

[52] U.S. Cl.................................. 29/200 D, 29/403
[51] Int. Cl....................... B23p 19/00, B23q 17/00
[58] Field of Search....... 29/403, 200 D, 200 R, 400

[56] References Cited
UNITED STATES PATENTS
2,782,494  2/1957  Gordon................................. 29/403
3,008,220  11/1961  Sammarco........................ 29/403 X Primary Examiner—Thomas H. Eager
Attorney, Agent, or Firm—Holman & Stern

[57] ABSTRACT

The extraction of reinforcing plies from automobile tires is accomplished through slackening the mounting portion thereof by making a great number of notches across the whole width of the cylindrical surface of the mounting portion by means of knives located in the plane of the tire bead.

The device for accomplishing this method is essentially a spindle with knives positioned thereon in a radial plane relative thereto, with the spindle having a diameter approximating the diameter of the mounting hole of a tire and being mounted with a possibility of lengthwise motion and simultaneous rotation with respect to the longitudinal axis thereof.

The method is advantageous due to the provision of optimum conditions of making notches across the whole width of the mounting portion of the tire beads which eliminates dulling of knives and provides an increase in the efficiency of the device as a whole.

5 Claims, 3 Drawing Figures

METHOD FOR EXTRACTING METAL REINFORCING PLIES FROM AUTOMOBILE TIRES AND A DEVICE FOR ACCOMPLISHING SAME

BACKGROUND OF THE INVENTION

The present invention relates to the production of tires and, more particularly to the reprocessing of worn out automobile tires and, precisely, to methods for extracting metal reinforcing plies from old automobile tires and to devices for accomplishing the same.

As is known, in order to reuse the rubber and cord fabric of old automobile tires, the latter should undergo a treatment which includes such a step as the process of shredding (cutting).

To make the shredding process much easier, the mounting portion containing metal reinforcing plies is separated from the tires as they complicate the process of shredding the tires and besides, contaminate the bulk of rubber and cord. Subsequent to the process of shredding tires together with reinforcing plies, cut to pieces reinforcing plies should be extracted from the bulk of scraps by means of electromagnets. In this case, cut metal plies can not be reused.

Another disadvantage of the method for shredding automobile tires together with reinforcing plies is the rapid blunting of the cutting tool.

PRIOR ART

A method for removing metal reinforcing plies from automobile tires is known in which the mounting portion of a tire is cut off around its cylindrical surface up to the level of the location of the metal reinforcing plies therein and then the reinforcing plies are squeezed out through the slackened portion.

This method is accomplished in a device comprising a clamping means in which the tire is set in a vertical plane and firmly fastened, and the cutting operating member is constituted by a system of knives fixed to a disk mounted with a possibility of lengthwise motion and simultaneous rotation.

The cutting member of this kind provides a circular cut-off of the mounting portion up to the level of the reinforcing plies. The subsequent squeezing-out of the plies from the tires is carried out by means of similar wedges mounted with a possibility of lengthwise motion and inserted into the body of a tire somewhat higher than the level of location of the reinforcing plies.

Some other devices which actually accomplih the same method but which differ in construction from those above-mentioned are known.

These devices comprise a rotary table which can provide the following processing steps: fastening of an automobile tire by a clamping means in a horizontal plane, cutting-off of the mounting portion of the tire bead by means of cutting members in the form of knives mounted on disks and capable of rotating and reciprocating simultaneously, and extracting the reinforcing plies by means of a wedge system in a manner similar to that above-described.

The common disadvantage of the above devices is an early rapid blunting of the knives due to non-uniform distribution of metal reinforcing plies in automobile tires.

In addition, the system of wedges is unable to provide a complete extraction of metal plies since in the process of extraction, the last plies tend to drop out from the wedges.

Known in the art are also devices for extracting metal reinforcing plies from automobile tires, which comprise a drum adapted to carry an automobile tire, and drive shafts mounted in parallelism to each other with a possibility of simultaneous rotation. One of the shafts in such devices is fixed and the other is positioned with a possibility of reciprocation; hence the shafts can approach and move away with respect to each other. Each of the drive shafts is provided with toothed disks mounted in series lengthwise thereon, cutting members, such as knives, and screw disks.

As the shafts, rotating simultaneously, approach each other, the tire is fastened with the toothed disks and the mounting portion is notched above the level of location of the reinforcing plies. Then, the mounting portion is squeezed from the tire by means of the screw disks and the reinforcing plies are extracted.

The main disadvantage of such a device is that the mounting portion of the tire bead may not be always cut off along the line of the metal ply location, since the distribution of the plies relative to the tire axis is not uniform. This results in the formation of zones which present obstacles to the extraction of the reinforcing plies from tires.

OBJECTS AND SUMMARY OF THE INVENTION

It is an object of the present invention to eliminate the above-mentioned disadvantages.

Another object of the present invention is to change the manner of making notches across the whole width of the mounting portion of a tire.

Still another object of the present invention is to change the manner of extracting reinforcing plies from automobile tires.

These objects are accomplished in a method of extracting metal reinforcing plies from automobile tires through slackening the mounting portion thereof by notching the latter to the level of location of the reinforcing plies by knives which are moved along the axis of the cylindrical surface of the mounting hole and rotated simultaneously around the same axis with a subsequent squeezing-out of the reinforcing plies through the slackened mounting portion by means of at least one wedge inserted into the mounting portion above the level of location of the reinforcing plies, in which according to the invention, the slackening of the mounting portion is accomplished by making a great number of notches across the whole width of the cylindrical surface of the mounting portion by means of knives located in the plane of the tire bead.

To obtain an optimum effect of notching, a device has been developed which comprises a cutting member consisting of knives mounted with a possibility of positive longitudinal motion and rotation with respect to the longitudinal axis thereof, and a means for squeezing out the reinforcing plies from an automobile tire which is essentially at least one wedge positioned with a possibility of longitudinal positive motion in which according to the invention, the knives are mounted on a spindle in a radial plane relative thereto, with the spindle having a diameter approximating the diameter of the mounting hole of a tire and being positioned with a possibility of lengthwise motion and simultaneous rotation with respect to the longitudinal axis thereof.

Particularly, the spindle of the device is defined by a system of horizontal rollers positioned in a circular pattern, with the knives being fixed between the rollers.

The knives may also be positioned on the spindle in several circular rows, with the knives of each successive row being advanced in respect to the knives of the preceding row.

Advantageously, the wedge for squeezing out the reinforcing plies from automobile tires be mounted on a spindle whose diameter approximates the diameter of the mounting hole of a tire, with the spindle being positioned with a possibility of lengthwise motion.

Given below is a detailed description of the invention with reference to the accompanying drawings, in which:

DETAILED DESCRIPTION OF THE EMBODIMENTS

The device for extracting metal reinforcing plies from automobile tires comprises a frame 1 (FIG. 1) having a longitudinal guide 2 provided with a drive 3 mounted thereon and connected with operating members movable along the guide 2.

Figure 1:
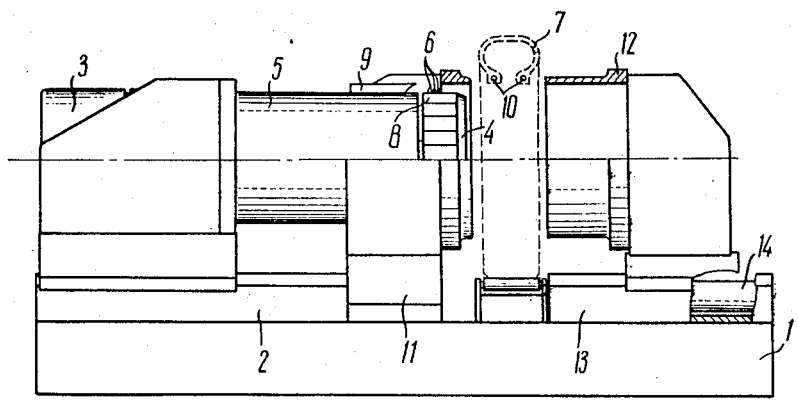
FIG. 1 is a general view of an embodiment of a device for extracting metal reinforcing plies from automobile tires accomplished in accordance with the present invention, in which the knives for slackening the mounting portion of a tire and the wedges for subsequent squeezing-out of the reinforcing plies from automobile tires are mounted on the spindles in series before the clamping means.
Figure 2:
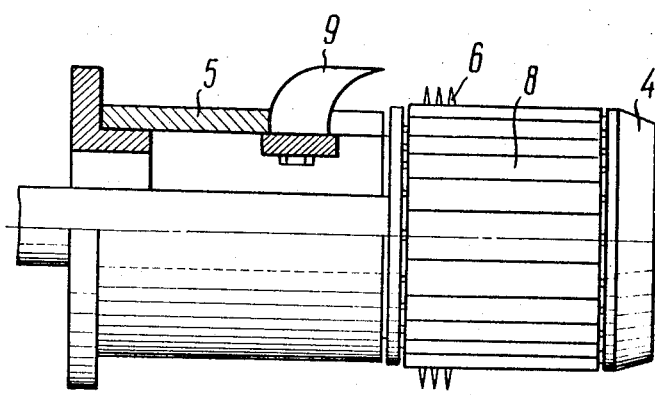
FIG. 2 is a general view of the spindles arranged in series with knives and wedges mounted thereon.

The operating members are constituted by two spindles 4 and 5 mounted coaxially (FIGS. 1 and 2). Knives 6 are fixed on the spindle 4 in a radial plane relative to the spindle. The diameter of the spindle 4 approximates the diameter of the mounting hole of a tire. The shaft 4 is defined by a system of horizontal rollers 8 positioned in a circular pattern, with the knives 6 being fixed between the rollers 8. The knives 6 are located on the spindle 4 in a number of rows in such a way that the knives 6 of each successive row are advanced in respect to the knives of the preceding row.

The spindle 5 whose diameter approximates the mounting hole diameter of a tire is provided with a means in the form of a wedge 9 to extract reinforcing plies 10 from an automobile tire 7. The movement of both spindles 4 and 5 is accomplished simultaneously by means of the common drive 3 which causes the spindle 4 to move lengthwise and simultaneously rotate relative to the longitudinal axis thereof, while the spindle 5 moves only lengthwise.

In addition, the frame 1 mounts a clamping means which is essentially a stationary bracket 11 and a movable bracket 12 which can be displaced along a guide 13 by means of a hydraulic cylinder-piston unit 14 to clamp the tire 7.

Figure 3:
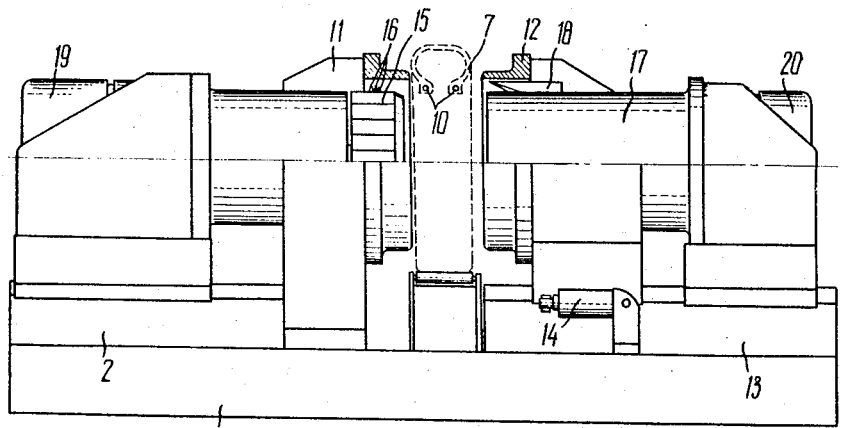
FIG. 3 is a view similar to FIG. 1 of a second embodiment of a device for extracting metal reinforcing plies from automobile tires, in which the wedges are mounted on the spindles positioned on the opposite sides relative to the clamping means.

FIG. 3 illustrates another embodiment of the device for extracting reinforcing plies from automobile tires with the only difference being that a spindle 15 with knives 16 mounted thereon for slackening the mounting portion of the tire 7 and a spindle 17 with a wedge 18 mounted thereof for squeezing out the metal reinforcing plies 10 from the tire 7 are positioned on the opposite sides relative to the clamping means. The spindle 15 is connected with a drive 19 which causes the spindle to move lengthwise and rotate with respect to the longitudinal axis thereof along the guide 2, with the spindle 17 being connected with a drive 20 which causes this spindle to move only lengthwise along the guide 13.

All the processing steps of the present method for extracting metal reinforcing plies in accordance with the first embodiment are accomplished as follows;

The automobile tire 7 (FIG. 1) is inserted into the clamping means between the brackets 11 and 12. Then, the drive 3 is activated to rotate the spindle 4 and displace it along the guide 2 providing a partial insertion of the spindle 4 into the mounting portion of the tire 7.

Thereafter, the bracket 12 is displaced along the guide 13 by means of the hydraulic cylinder-piston unit 14 to fasten tightly the tire 7.

In order to slacken the mounting portion, the cylindrical surface thereof is covered with a great number of spiral notches across the whole width. The notches are made by means of the knives 6 inserted into the mounting portion of the tire 7 above the level of location of the reinforcing plies 10.

Subsequent to the slackening of the mounting portion of the tire 7, the spindle 4 continues to move lengthwise and leaves the hole of the tire 7; the spindle 5 which is operated by the same drive 3 enters the hole of the tire 7, penetrates into the hole with the wedge 9 and catches the plies 10 to extract the latter from the tire 7.

In the reverse motion of the spindles 4 and 5 through the hole of the tire 7, the reinforcing plies 10 are retarded for a while on the spindle 5 as a result of which the hole diameter of the tire 7 is considerably less than the diameter of plies 10. Then the spindles 4 and 5 are returned to the initial position by the drive 3 and the bracket 12 is returned to the initial position along the guide 13 by means of the hydraulic cylinder-piston unit 14.

At this moment, the automobile tire 7 and the reinforcing plies 10 are removed from the clamping means.

The operation of the device in accordance with the embodiment shown in FIG. 3 is as follows.

Similar to the first embodiment, the automobile tire 7 is set and fastened between the brackets 11 and 12. Then the drive 19 is activated to rotate the spindle 15 and displace the spindle along the guide 2 into the hole of the tire 7, with the knives 16 making spiral notches in the mounting portion of the tire 7.

As the mounting portion of the tire 7 is slackened, the spindle 15 is reversed and returned to the initial position. At this, moment the drive 20 is activated to provide a lengthwise motion of the spindle 17 relative to the longitudinal axis of the device. THerewith, the spindle 17 carrying the wedge 18 enters the hole of the tire 7 above the level of the reinforcing plies 10 to catch and withdraw the latter from the tire 7.

The spindle 17 is returned to its initial position by means of the drive 20 and at the moment of the reverse motion of the spindle 17 through the hole of the tire 7, the reinforcing plies are retarded in a manner similar to the first embodiment of in FIG. 1.

Then the movable bracket 12 is returned to the initial position along the guide 13 by means of the hydraulic cylinder-piston unit 14.

The released automobile tire 7 and the reinforcing plies 10 may be removed from the device.

The method according to the present invention for extracting metal reinforcing plies from automobile tires and the device for accomplishing same are advantageous as they provide for an economy of rubber and cord fabric up to 12 percent per a tire and metal up to 30 percent, eliminate airborne pollution caused by the necessity to burn tire beads and bring about a reduction of labor costs for transporting and burning tire beads.

The method and the device for extracting reinforcing plies from automobile tires, according to the invention, provide optimum conditions for making notches on the mounting portion of tires which practically eliminates dulling of knives and provides optimum conditions for extracting metal reinforcing plies resulting in an increased efficiency of the device as a whole.

What we claim is:

1. A method for extracting metal reinforcing plies from automobile tires comprising the steps of slackening a mounting portion of the tire by making numerous notches across the whole width of the cylindrical surface of the mounting portion up to the level of location of reinforcing plies therein by means of knives located in the plane of the tire bead and subsequently squeezing out the reinforcing plies through the slackened mounting portion by means of at least one wedge inserted into the mounting portion above the level of the location of the reinforcing plies.

2. A device for extracting metal reinforcing plies from automobile tires comprising: a frame, a spindle mounted on the frame with a possibility of lengthwise motion and simultaneous rotation with respect to the longitudinal axis thereof, said spindle having a diameter approximating the diameter of a mounting hole of a tire, knives mounted on the spindle in a radial plane relative thereto, and means for squeezing out the reinforcing plies from an automobile tire defined by at least one wedge positioned with a possibility of longitudinal positive movements.

3. The device according to claim 2 wherein the spindle is defined by a system of horizontal rollers positioned in a circular pattern, with the knives being fixed between the rollers.

4. The device according to claim 3, wherein the knives are positioned on the spindle in several circular rows, with the knives of each successive row being advanced in respect to the knives of the preceding row.

5. The device according to claim 2, wherein the wedge for squeezing out the reinforcing plies from the tires is mounted on a spindle having a diameter approximately the diameter of the mounting hole of the tire, with said spindle being positioned with a possibility of lengthwise motion.

* * * * *